June 10, 1969    A. P. LIMBACH ET AL    3,448,775
HOLLOW CONTAINER BODY
Filed April 26, 1966
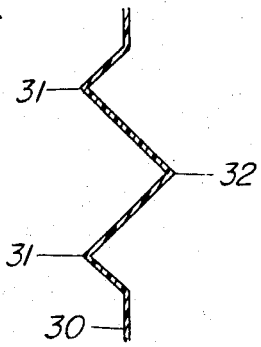
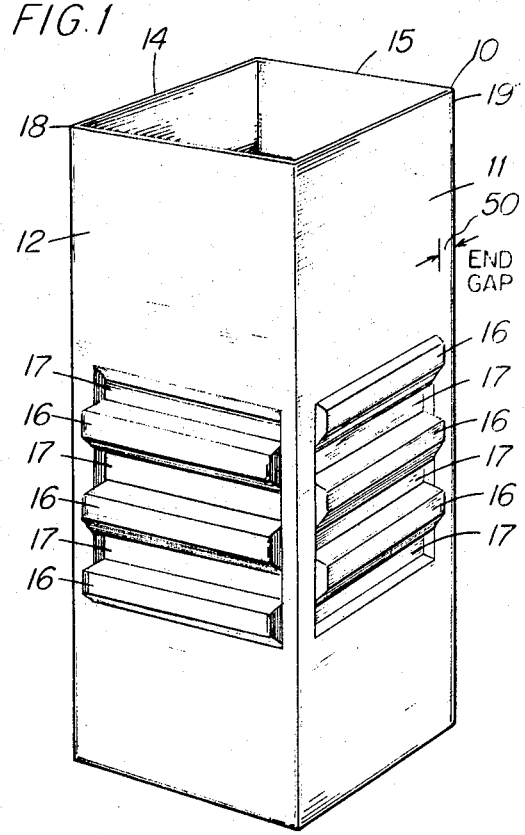
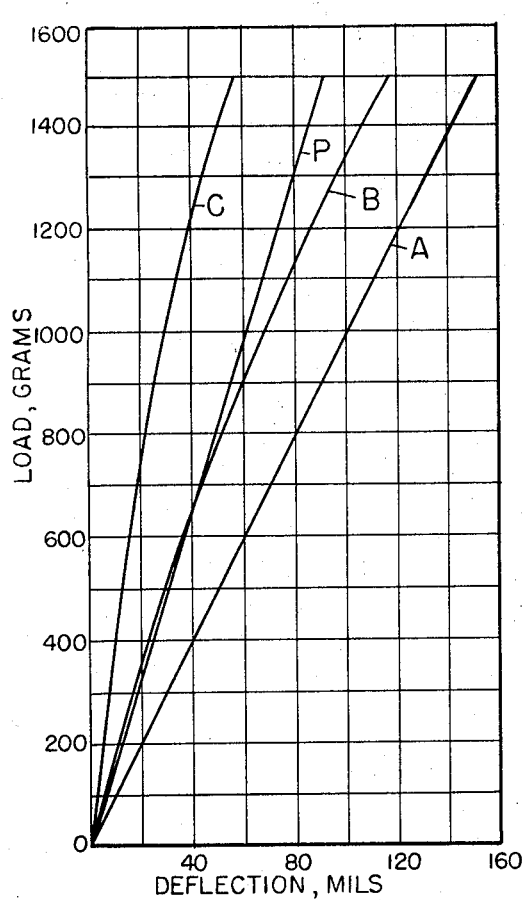
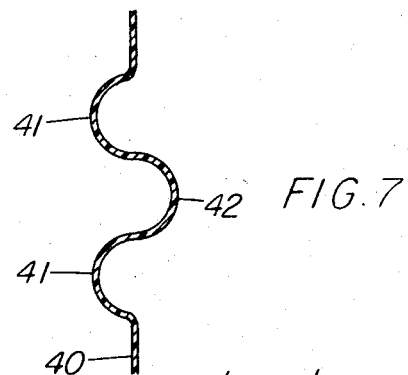
Inventors
Anthony Paul Limbach
Andrew J. Foglia
By
Hastings S. Trigg
Attorney Inventors
Anthony Paul Limbach
Andrew J. Foglia By Hastings S. Trigg
Attorney United States Patent Office 3,448,775
Patented June 10, 1969

3,448,775
HOLLOW CONTAINER BODY
Anthony Paul Limbach, Somerset, N.J., and Andrew J. Foglia, Brooklyn, N.Y., assignors to Mobil Oil Corporation, a corporation of New York
Filed Apr. 26, 1966, Ser. No. 545,281
Int. Cl. F16l 9/12; B65d 1/24, 3/28
U.S. Cl. 138—173          4 Claims

ABSTRACT OF THE DISCLOSURE

A collapsible layflat container body comprises a thin-walled rectangular parallelopiped open at the long ends, characterized by a plurality of ribs and depressions on each side. The ribs and depressions are so positioned that in the layflat position ribs on one side nest into depressions of the adjacent side. The container body is prepared by molding a flattened tube of thermoplastic material.

---

This invention relates to hollow containers. It is more particularly concerned with layflat container bodies made from thermoplastic material and with a process for manufacturing them.

In the manufacture of containers, such as dairy cartons, the use of thermoplastic material is somewhat restricted by cost to a level competitive with, for example, paper containers, the amount of plastic used has been minimized by resort to the use of thin walls. Containers made with flat, thin walls are usually not satisfactory, because the walls bulge considerably when the container is full and tend to jam the containers together in shipping cartons. Further, thin walls tend to collapse when the article is handled and, particularly when the closure is open, part of the contents may be ejected involuntarily by a squeezing action on the container.

A certain amount of rigidity may be imparted to flat, thin walls by the use of ribs. Generally, ribbed containers are produced by vacuum molding or pressure molding. In such operations, a sheet or film of thermoplastic material is heated to suitable softness, inserted into a female mold cavity by means of a mandrel, and drawn against the mold sides by the application of vacuum or air pressure. After the molding operation, surrounding material must be trimmed away as scrap.

In molding operations of this type, the thermoplastic sheet must be heated to a temperature wherein it is very soft and pliable, in order to ensure faithful reproduction of the mold contours. Generally, this means a temperature above the crystalline melting point. Accordingly, more heat must be extracted during the cooling cycle. It will be readily appreciated that shorter cooling time will be required, if a container body can be molded at a temperature below the crystalline melting point.

It has now been found that a container body can be formed from thermoplastic material at temperatures below the crystalline melting point of such material. It has been discovered there can be formed a layflat container body in the form of a rectangular parallelopiped, open at the long ends, having a novel, effective rib structure, and without waste due to trimming.

Accordingly, it is an object of this invention to provide collapsible, layflat container bodies and a process for manufacturing them. Another object is to provide a method for manufacturing collapsible, layflat container bodies having a novel, effective rib structure. A specific object is to provide a collapsible, layflat container body formed of thermoplastic material, which container body has relatively thin walls and a novel, effective rib structure. A more specific object is to provide such a container body in the form of a rectangular parallelopiped open at the long ends. Other objects and advantages of this invention will become apparent to those skilled in the art, from the following detailed description considered in conjunction with the drawings, wherein:

FIGURE 1 is an isometric view of a typical embodiment of the collapsible container body of this invention;

Figure 2:
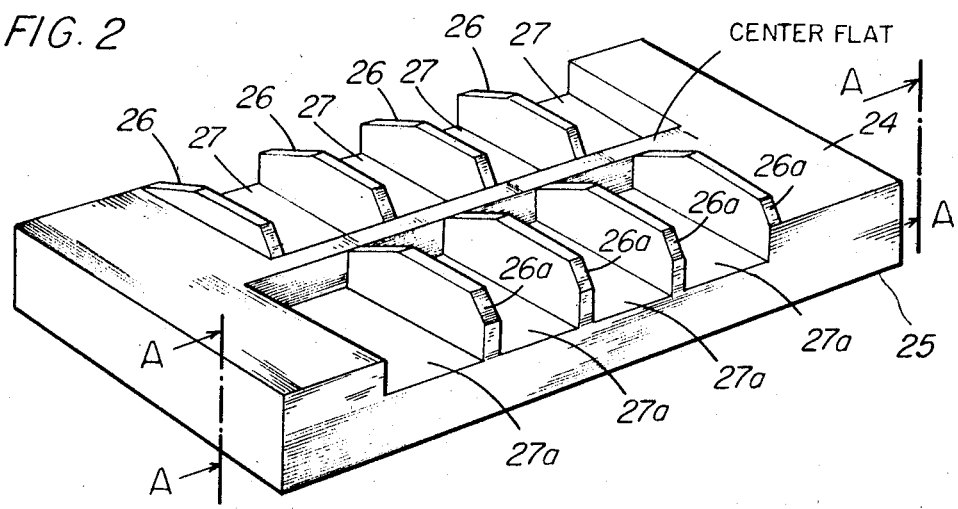
FIG. 2 is an isometric view of the die form used in the die assembly.

FIG. 5 presents the graphic relationship between the load and the amount of deflection of ribbed side walls of the container bodies having varying rib end gaps in comparison to conventional paper carton walls; and FIGS. 6 and 7 present longitudinal sectional views showing alternative rib profiles.

In general, this invention provides a collapsible layflat container body which comprises a thin-walled rectangular parallelopiped open at the long ends, having, on one of adjacent sidewalls, a plurality of ribs outwardly disposed, with respect to the plane of the sidewall, extending in a general horizontal direction and, on the other of adjacent sidewalls, a corresponding plurality of ribs inwardly disposed, with respect to the plane of the sidewall, extending in a similar general horizontal direction; said outwardly disposed ribs on one sidewall being juxtapositioned with said inwardly disposed ribs on the adjacent side.

In a preferred embodiment, this invention provides a collapsible layflat container body which comprises a thin-walled rectangular parallelopiped open at the long ends, having on each sidewall a plurality of ribs outwardly disposed, with respect to the plane of each sidewall, extending in a general horizontal direction and corresponding plurality of ribs inwardly disposed, with respect to the plane of each sidewall extending in a similar general horizontal direction; said outwardly disposed ribs on one sidewall being juxtapositioned with said inwardly disposed ribs on an adjacent sidewall, whereby when the container body is collapsed in a flat position the inwardly disposed ribs of one sidewall will nest in the outwardly disposed ribs of the adjacent sidewall.

This invention also provides a molding process for forming layflat container bodies, which comprises pressing a flattened tube of thermoplastic material, heated to a temperature below the crystalline melting point thereof, between an upper and a lower die section; said lower die section having on the face thereof two longitudinally arranged rows disposed on either side of the center axis of said face, each row being of equal width, and one row comprising a plurality of male rib-forming members extending above the plane of said face and the other row comprising a corresponding plurality of depressions extending below the plane of said face to a depth slightly greater than the height said male members extend above the plane of said face, said male rib-forming members in one row being in juxaposition with depressions in the other row; said upper die section being identical with said lower die member; whereby when said heated flattened tube of thermoplastic material is pressed between the faces of the upper and lower die sections, the male rib-forming members of each section penetrate into a corresponding depression of the other section carrying a portion of the flattened tube of thermoplastic material into said corresponding depression and forming a pair of nested ribs.

The preferred molding process of this invention comprises pressing a flattened tube of thermoplastic material, heated to a temperature below the crystalline melting point thereof, between an upper and a lower die section; said lower die section having on the face thereof two longitudinally arranged rows disposed on either side of the center axis of said face, each row being of equal width and containing a plurality of male rib-forming members extending above the plane of said face and a corresponding plurality of depressions between said male rib-forming members and extending below the plane of said face to a depth slightly greater than the height said male members extend above the plane of said face, said male rib-forming members in each row being in juxtaposition with a depression in the other row; said upper die section being identical with said lower die member; whereby when said heated flattened tube of thermoplastic material is pressed between the faces of the upper and lower die sections, the male rib-forming members of each section penetrate into a corresponding depression of the other section carrying a portion of the flattened tube of thermoplastic material into said corresponding depression and forming a pair of nested ribs.

Turning now to the drawings, wherein like components are designated by the same number, FIG. 1 shows an isometric view of a typical embodiment of the collapsible container body of this invention. It comprises a thin-walled rectangular parallelopiped body 10 open at each end and constructed of thermoplastic material. Although high density polyethylene was used in the embodiments described, other thermoplastic materials, as hereinafter described, can be used. In general, the wall thickness can be between about 10 mils and about 25 mils. Variations in thickness of as much as 5 mils can be tolerated.

On each adjacent side wall 11 and 12 (and substantially identical side walls 14 and 15, respectively), there are a plurality (at least two) of ribs 16, outwardly disposed with respect to the plane of each sidewall, which extend in a generally horizontal direction. The term "generally horizontal direction," as used herein, embraces not only the true horinzontal shown in FIG. 1. It also includes ribs that can be at an angle of up to 15–20° of the true horizontal, for better aesthetics.

Also on each adjacent side wall 11 and 12 (and 14 and 15), there are a corresponding plurality (i.e., coresponding in number and form to the ribs 16) of ribs 17, inwardly disposed with respect to the plane of each side wall, and which extend in a generally horizontal direction corresponding to that of the ribs 16. As is demonstrated hereinafter, the ribs 16 and 17 should not terminate at a substantial distance from the corners of the body 10, inasmuch as this could create flexure points adjacent to the ribbed section which could destroy overall effectiveness.

In each of the adjacent side walls 11 and 12, the ribs 16 on one side wall are in juxtaposition with (or juxtaposed to) the ribs 17 on the other adjacent side wall. As a result of this relationship between the ribs, the container can be folded flat with any adjacent side and the ribs will intermesh. For example, when the container body is flattened so that corners 18 and 19 abutt, each rib 17 on side walls 11 and 12 (and on 14 and 15) will nest in its corresponding rib 16, forming a flat compact structure that occupies a minimum of space. Furthermore, each container body is nestable with other containers of the same type in a layflat condition. This reduces shipping and storage volumes.

In FIG. 2 there is illustrated a typical die section for forming the container body of this invention. As will become apparent from the following description, the upper and lower die sections are identical. On the face 24 of the die section 25 there are two rows of forming members longitudinally disposed on either side of the center axis of the face 24. Each row contains a plurality of male rib-forming members 26 and 26a, which extend above the plane of the face 24. In each row there is also a corresponding plurality of depressions 27 and 27a which extend below the plane of the face 24. The depth to which these depressions extend is greater than the height to which the male members extend above the plane of the face 24. In general practice this will be just slightly more than twice the thickness of the walls 11, 12, 14, and 15 (FIG. 1). In the embodiment shown, the rows of rib-forming members are sepaarted by a flat portion 28 along the central axis. In each row of rib-forming members and depressions, the rib-forming members will be in juxtaposition with the depressions of the other row. Thus, rib-forming members 26 will juxtapose depressions 27a and rib-forming members 26a will juxtapose depressions 27.

When a die member identical to the die member 25 is inverted over the die section 25, it will be apparent that the male rib-forming members will engage the depressions of the other die section. Thus, rib 26 in an upper die member will engage depression 27a in a lower die member.

Figure 3:
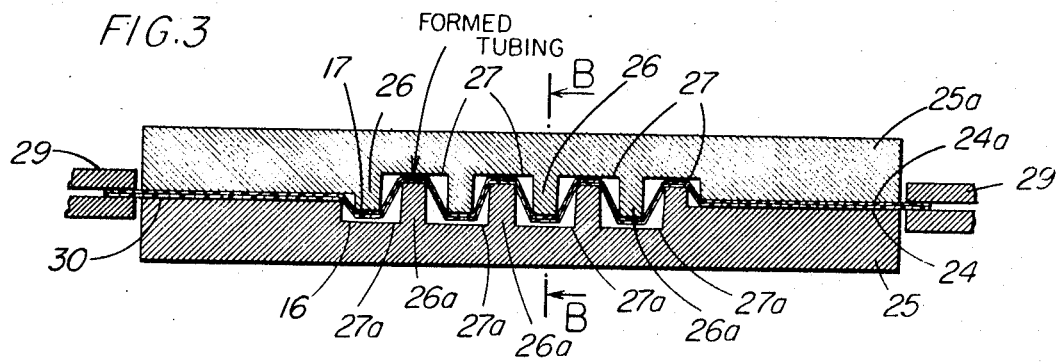
FIG. 3 is a longitudinal sectional view of a typical die assembly for forming the container body of FIG. 1 taken along the plane A—A in FIG. 2.
Figure 4:
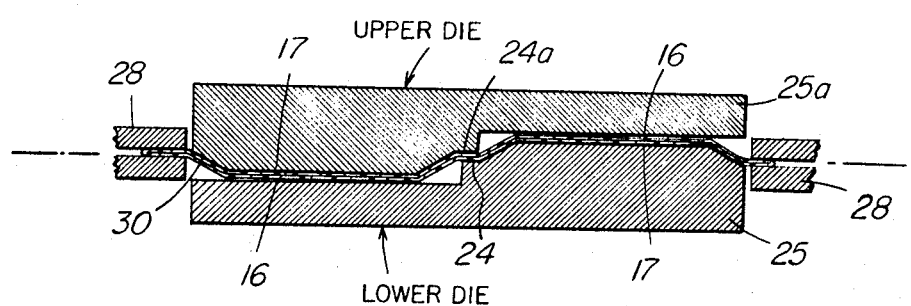
FIG. 4 is a transverse sectional view of a typical die assembly for forming the container body of FIG. 1, taken along the plane B—B in FIG. 3.

A description of the molding operation using the die members shown in FIG. 2 will further clarify the operation of this invention. Reference is now made to FIGS. 3 and 4. FIG. 3 is a longitudinal sectional view of a typical die assembly for forming a layflat, collapsible container body of FIG. 1, taken along the plane A—A in FIG. 2. FIG. 4 is a transverse sectional view of a typical die assembly for forming the container body of FIG. 1, taken along the plane B—B in FIG. 3. The die assembly shown in FIGS. 3 and 4, comprise a lower die section 25 and identical, upper die section 25a, side clamping means 28 and end clamping means 29.

In operation, a length of flattened tube of thermoplastic material, such as high density polyethylene, having a wall thickness of 10–25 mils is heated to within about 10° C. below its crystalline melting point, e.g., about 128° C. for high density polyethylene. The heated flattened tube 30 is clamped at the sides with the clamps 28 and at the ends with clamps 29. The heated, clamped assembly is placed between the lower die section 25 and the upper die section 25a and the two sections are pressed together, until mold faces 24 and 24a engage the tube 30. The clamps tend to prevent lateral and longitudinal displacement of the heated flattened polyethylene tube 30.

As a result of this action, the male rib-forming members 26 on upper die section 25a carry portions of the double film layer of tube 30 into the depressions 27a of lower die section 25. Similarly, the male rib-forming members 26a of lower die section 25 carry portions of the double film layer of tube 30 into the depressions 27 of upper die section 25a. As a result and upon cooling, there are permanently formed protruding ribs 16 having inwardly disposed ribs 17 nested therein.

It is to be noted that the ribs formed in the present invention are mechanically stronger than those produced by prior art vacuum forming processes or pressure forming processes. As is well known, when a plastic film is drawn into a mold indentation to form a rib, by using vacuum or pressure, greatest stretching occurs in the deeper portion of the indentation. Thus, the rib so formed has a crown that is thinner than the sides of the ribs. On the other hand, in forming ribs by the method of this invention the male mold member carries the plastic into the depression with little stretching of the portion that forms the crown. Stretching occurs in the rib sides. As those skilled in the art will appreciate, such a rig having a thicker crown is mechanically strong.

The layflat tube assembly, thus obtained, is removed from the die assembly. It is then scored along the longitudinal central axis. The scored layflat container body assembly can then be opened along the scored axis of each scored surface and the edges of the layflat tube to form the container body, such as shown in FIG. 1.

As has been mentioned hereinbefore the ribs should not terminate at a substantial distance from the corners of the body 10. In the particular case of the one-quart container, comparable to the conventional one-quart paper container, the end gap 50 (FIG. 1) between the rib end and a corner should be no more than 3/8" and preferably 3/16" or less. This is demonstrated in the following example.

*Example*

Using high density 17 mil polyethylene film, a series of 3 panels was made with four 3/16" high ribs similar to those of FIG. 1. Each panel corresponded to a single side panel of a container. In each polyethylene panel, the ribs terminated at 3/8", 3/16", and 3/32" from the panel edge (corner). For comparison purposes, a conventional paper side panel was used.

To test deflection, indicating panel strength, each panel supported upon blocks at each end and was subjected to varying vertical loads applied transversely. The amount of downward deflection of each panel from the normal horizontal was measured at each load. The pertinent data for each panel are set forth in the table.

TABLE

| End gap, in. | Load, g. | Deflection, mils |
|---|---|---|
| 3/8 | 200 | 20 |
|  | 500 | 60 |
|  | 1,000 | 95 |
|  | 1,500 | 151 |
| 3/16 | 200 | 10 |
|  | 500 | 25 |
|  | 1,000 | 70 |
|  | 1,500 | 115 |
| 3/32 | 200 | 5 |
|  | 500 | 12 |
|  | 1,000 | 30 |
|  | 1,500 | 55 |
| Paper | 200 | 12 |
|  | 500 | 31 |
|  | 1,000 | 62 |
|  | 1,500 | 91 |

The curves in FIG. 5 are based upon the data in the table. These curves show the graphical relationship between loads placed upon panels and the resultant deflection of the panels having varying end gaps, in comparison to standard paper panels. In FIG. 5, Curve A is for a panel having end gaps of 3/8". Curve B is for a panel having end gaps of 3/16". Curve C is for a panel having end gaps of 3/32". For comparison, Curve P is that for a paper panel.

It will be noted that when the end gap is 3/32" or less (Curve C) the panel is superior in strength to the standard paper panel (Curve P). With an end gap of 3/16" (Curve B), the ribbed panel is substantially equivalent to paper, except at high loads. Panels having an end gap of 3/8" (Curve A) are generally poorer in flow strength than paper panels. This performance can, of course, be improved by increasing the wall thickness, e.g., to 20 mils. In general, however, it is preferred that the rib ends terminate no more than 3/16" from the container corners and, preferably, no less than 3/32" from the corners. In one preferred embodiment of the layflat container body of this invention, the rib will terminate at, or nearly at, a container corner at one rib end and from about 3/32"–3/16" from the container corner at the other end.

It will be understood that the basic principle of this invention of juxtapositioned (or juxtaposed) outwardly and inwardly disposed ribs on adjacent container body sides can lead to a variety of rib configurations, wherein the ribs are not all exactly horizontal. As has been mentioned hereinbefore, the ribs are still considered to be in a horizontal direction, even though they are angled up to 15–20° from the true horizontal. Such variations in rib disposition, or angling, can be readily met by suitable changes in the basic die form design, which changes will be readily apparent, from this disclosure, to those skilled in the art. Instead of the squared rib cross-section such as that of FIG. 1, other rib profiles can be used. Typical profiles are illustrated in FIGS. 6 and 7, which show a longitudinal sectional view of a portion of a container sidewall. Thus, as is shown in FIG. 6, relative to the plane of the sidewall 30, the outwardly disposed ribs 31 and the inwardly disposed rib 32 can have a V-shaped profile. As shown in FIG. 7, relative to the plane of the sidewall 40, the outwardly disposed ribs 41 and the inwardly disposed rib 42 can have a profile that is substantially semi-circular. Typical variations are disclosed and claimed in design patent applications Ser. No. 2,093, 2,095, and 2,094, filed concurrently herewith, now Design Patents Nos. 210,193, 210,195, and 210,194, respectively.

The container body of this invention has been described with each sidewall having ribs that alternate inwardly and outwardly disposed with respect to the plane of the sidewall, with the outwardly disposed ribs of one sidewall juxtaposed with inwardly disposed ribs on an adjacent sidewall. As has been indicated hereinbefore, this is the preferred embodiment of the container body, affording good structural strength in the sidewall.

Within the board contemplation of this invention, however, each sidewall need not have alternate inwardly and outwardly disposed ribs. Considering any pair of adjacent sidewalls, one sidewall can have a plurality of ribs all outwardly disposed, with the section between the ribs being a flat surface on the plane of the sidewall. In this case, the adjacent sidewall would have a corresponding plurality of ribs all inwardly disposed. A primary feature of this invention still persists, however, namely that the outwardly disposed ribs on one sidewall will be juxtaposed with an inwardly disposed rib on the adjacent sidewall.

A structure of this type can be made by the molding process of this invention, with suitable mold design. For example, referring again to FIGS. 2 and 3, in the die members in place of male rib-forming members 26, these members would be cut to the plane of the face 24. Likewise, the depressions 27a that opposed the male rib-forming members 26 (now omitted) would be filled to the plane of the face 24. It will be apparent that this broad embodiment also retains the feature, in the layflat position, of nesting inwardly and outwardly disposed ribs on adjacent sidewalls.

A wide variety of thermoplastic polymers are utilizable for making the layflat container bodies of this invention. Nonlimiting examples include polyethylene, polypropylene, polybutene-1, other polyolefins and copolymers thereof, polyvinyl chloride and related vinyl polymers, nylon, polyaldehydes, polystyrene, high impact grade polystyrene, acrylonitrile-butadiene-styrene resins, cellulose acetate, cellulose acetate-butyrate, and the acrylics, such as polymethylmethacrylate. These polymers can have, as is well known in the art, other materials incorporated therein, such as pigments dyes, fillers, extenders, plasticizers, and stabilizers to promote resistance to heat, oxidation, and ultraviolet light.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A collapsible layflat body adaptable to form a container, which comprises a thin-walled rectangular parallelopiped open at the long ends, having, on one of adjacent sidewalls, a plurality of ribs outwardly disposed, with respect to the plane of the sidewall, extending in a general horizontal direction, each rib having a crown thicker than its sidewall and, on the other of adjacent sidewalls, a corresponding plurality of ribs inwardly disposed, with respect to the plane of the sidewall, extending in a general horizontal direction, each rib having a crown thicker than in its sidewall; said outwardly disposed ribs on one sidewall being juxtapositioned with said inwardly disposed ribs on the adjacent sidewall, whereby when said body is collapsed in a flat position the inwardly disposed ribs of one sidewall will nest in the outwardly disposed ribs of the adjacent sidewall.

2. A collapsible layflat body adaptable to form a container, which comprises a thin-walled rectangular parallelopiped open at the long ends, having on each sidewall a plurality of ribs outwardly disposed, with respect to the plane of each sidewall, extending in a general horizontal direction, each rib having a crown thicker than its sidewall and a corresponding plurality of the ribs inwardly disposed, with respect to the plane of each sidewall extending in a similar general horizontal direction, each rib having a crown thicker than its sidewalls; and outwardly disposed ribs on one sidewall being juxtapositioned with said inwardly disposed ribs on an adjacent sidewall, whereby when said body is collapsed in a flat position the inwardly disposed ribs of one sidewall will nest in the outwardly disposed ribs of the adjacent sidewall.

3. The body defined in claim 1, wherein each rib terminates between about 3/32″ and about 3/16″ from the body corner.

4. The body defined in claim 2 wherein each rib terminates between about 3/32″ and about 3/16″ from the body corner.

References Cited

UNITED STATES PATENTS

| | | | |
|---|---|---|---|
| 1,516,090 | 11/1924 | Gary et al. | 229—17 XR |
| 3,286,902 | 11/1966 | Hunter et al. | 229—7 XR |

LAVERNE D. GEIGER, *Primary Examiner.*

H. K. ARTIS, *Assistant Examiner.*

U.S. Cl. X.R.

220—72; 229—7, 17